Figure 1:
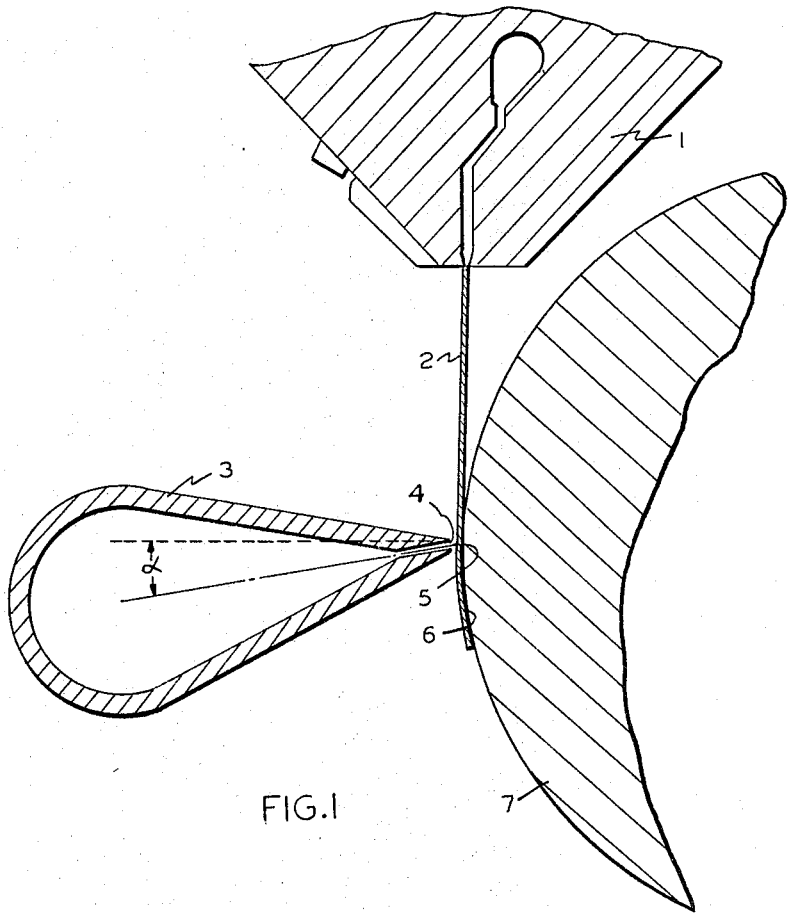

3,277,227
MANUFACTURE OF POLYOLEFIN FILMS
Helmut Kesseler, Wiesbaden-Biebrich, and Klaus Jürgen Gleffe, Wiesbaden, Germany, assignors to Kalle Aktiengesellschaft, Wiesbaden-Biebrich, Germany, a corporation of Germany
Filed Apr. 18, 1962, Ser. No. 188,585
Claims priority, application Germany, Apr. 20, 1961, K 43,521
12 Claims. (Cl. 264—216)

This invention relates to a process for the manufacture of polyolefin films by extrusion from the melt, in which even at high speeds of production films having a smooth surface can be obtained and, at the same time, the slip properties of the film produced are improved.

It is known to work up polyolefins to films using worm presses and wide slotted nozzles. The molten film leaving the nozzle is caused to meet a roller at controlled temperature so that the cooling of the film is accelerated. The nature of the surface of a polyolefin film produced in this manner depends upon the surface of the roller upon which it is extruded. Films of smooth surface are obtained when highly polished rollers are used.

It is necessary that after the film has met the roller it should remain in continuous contact therewith. In this way films are obtained of optimum transparency and, owing to the rapid quenching effect, also having optimum physical properties. However, on exceeding a certain speed of production, for example about 10–20 metres per minute, it becomes very difficult to retain the necessary continuous contact of the film with the roller, for the reason that air is drawn in between roller and film so that at medium speeds contact is prevented over small areas and at higher speeds direct contact of the film with the roller is prevented over the whole area. In the extrusion of polypropylene, clear films are obtained at a production speed of less than 10 metres per minute, at a speed of 10–20 metres per minute on account of local air inclusions films are obtained with more or less visible turbid spots, and at still higher speeds the whole of the film becomes turbid.

As another undesired property which is often encountered, synthetic plastic films, especially polyolefin films, exert a high resistance against movement thereof in contact with one another or with respect to other surfaces. In such cases, one speaks of bad slip properties of the film. In the case of films of thicknesses below 100μ the tendency to adhere together is especially great. Bad slip properties render difficult the ordinary winding and further working up of the films. In some cases, when in the rolled condition, these films adhere together to such an extent that they can only be torn apart. This is especially the case with very clear films.

The present invention provides a process for the manufacture of polyolefin films wherein molten polyolefin is extruded in sheet form onto a moving surface and a jet of air or an inert gas to which an agent for improving the slip of the film is added in the form of an aerosol is directed over the whole width of the sheet at a stage in its travel before its temperature has fallen below the softening range of the polyolefin, the arrangement being such that the air jet causes the sheet to be pressed against the moving surface under a restraining pressure. By means of this process, smooth and uniformly clear films of good slip properties are obtained even at high production speeds.

The restraining pressure to be exerted upon the film by the air jet at its impingement locality is advantageously between 25 and 1000 mm. of water. The jet may be produced by means of a slotted nozzle having a width of slot of 0.1 to 1.5 mm. The necessary restraining pressure depends upon the nature of the polymer, the temperature of the molten mass, the temperature of the moving surface (roller), the thickness of the film and the production speed. In the manufacture of films of polypropylene, restraining pressures of 50 to 100 mm. of water are sufficient, while in the case of polyethylene of high density, i.e. of 0.940 or more, at least double this pressure must be applied. The air of the jet may be used at room temperature or with pre-heating within a temperature range up to the temperature of the polymer bulk. Instead of air other gaseous media may be employed which do not react with the polyolefin. When using an inert gas, such as nitrogen or carbon dioxide, the superficial oxidation of the fused polyolefin is reduced. A restraining pressure below 25 mm. of water will only in exceptional cases press the film sufficiently tightly against the roller. Restraining pressures above 1000 mm. of water have not been found to offer any advantage over lower restraining pressures. The restraining pressure exerted by the air jet upon the film must be sufficient in order to ensure continuous contact of the hot film with the roller and to avoid inclusion of air between film and roller even when working at high speeds, for example of 50 metres per minute and above. In this manner, at high speeds, films of excellent surface and great clarity are obtained.

Among the slip-improving agents that can be added to the air jet belong very many natural or synthetic inorganic or organic substances. They are advantageously employed in aqueous solution or dispersion, although organic solvents may be used, if desired mixed with water. Examples of water-soluble slip agents are inorganic salts, such as sodium chloride, sodium carbonate, sodium bicarbonate, sodium perborate, sodium sulfate, calcium bromide, trisodium phosphate, and magnesium sulfate. Magnesium oxide, zinc oxide, calcium carbonate, titanium dioxide, silica, kaolin, bentonite, aluminum oxide, mica and glass powder may be used in aqueous or organic suspension. Other materials include sodium oxalate, sodium fumarate, zinc stearate, sodium terephthalate, dimethyl terephthalate, terephthalic acid, polyvinyl alcohol, methyl cellulose, hydroxy-methyl cellulose, sodium alginate, dextrin, starch, casein and zein. Also colored salts such as cobaltous chloride, Mohr's salt, chromic chloride and copper sulfate may be used, in which case an improvement as regards optical brightening may be achieved. Liquid substances may also be used such as silicone oil, linseed oil, olive oil, paraffin oil, glycerol, glycol and methyl alcohol. The above are given by way of example only.

Figure 2:
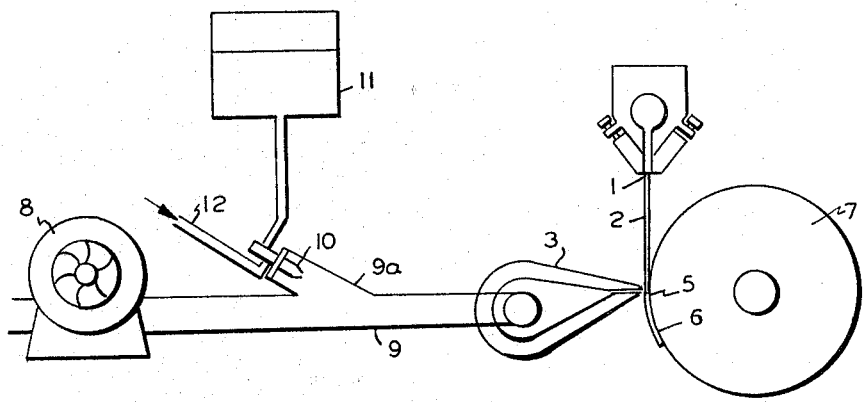
Figure 3:
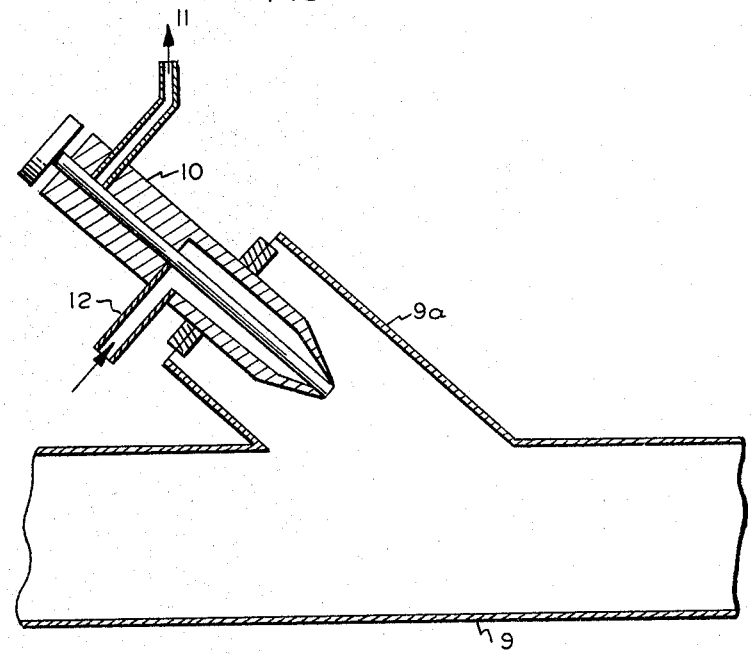

The process will be further explained below with reference to FIGS. 1 to 3, which are diagrammatic sections, of which FIG. 1 shows an air brush and its arrangement, FIG. 2 shows an apparatus for performing the process, and FIG. 3 shows the atomizer nozzle of FIG. 2 at a larger scale.

Referring to the drawings, film 2 extruded from a slotted extruder nozzle 1 will in this description be so called even though still molten. Upon the film 2, from the exit slot 4 of an air nozzle 3, an air jet is so directed as to cause it to make contact with a moving surface in the form of a roller 7.

The use of a wide air jet for the treatment of the surfaces of materials is known per se in the art. Such a jet has been called an "air brush," by which is understood a narrow air jet produced by means of a slotted nozzle. Air brushes are used for example for blowing off excess liquid in the lacquering or impregnation of paper or film webs.

In the process of the invention it is important that the air jet should impinge upon the film 2 before the film reaches the so-called "frost line." By the term "frost line" is understood the line joining points on the film 2 which have just fallen below the softening temperature range of the film material. This line is indicated in FIGS. 1 and 2 by the numeral 6. In some cases the frost line 6 is visually recognisable by a slight turbidity of the film 2 lying upon the roller. Treatment of the film 2 with the air jet beyond the frost line 6, i.e. at a point where the film temperature has fallen below the softening point, is without effect.

In addition to the frost line 6, the impingement line 5 of the film upon the roller is of importance. This is the line parallel to the roller axis along which the film would contact the roller if no air jet were applied to it. At high production speeds the film would under these conditions meet the roller substantially tangentially. The separating distance between the frost line 6 and the impingement line 5 depends upon the temperature, the film thickness and the production speed.

The effect produced upon the polyolefin film by treatment according to the invention by means of an air jet emitted by the nozzle 3 is at a maximum when the jet impinges upon the film 2 at a point adjacent to the impingement line 5. It is most advantageous if the jet meets the foil just before it reaches the line 5, as it would be if the air jet were not applied. Under the influence of the air jet a new contact line is produced which compared with the impingement line 5 existing without the air jet, is closer to the extrusion nozzle. An advantage of the creation of this new contact line closer to the nozzle is that it is more exactly rectilinear. When the air jet is caused to meet the foil 2 after it has already made contact with the roller, imperfections in the film may occur, for example by partial adhesion of the film to the roller, which cannot afterwards be removed.

It has further been discovered that it is of advantage to cause the air jet from the nozzle 3 to meet the film not perpendicularly but at an angle $\alpha$ of 5–20° from the normal to the film surface, so that the angle to the approaching film is 95 to 110°. The air jet is thus directed slightly towards the extruder nozzle 1.

The separating distance of the nozzle 3 from the film 2 may be between 1 mm. and 50 mm. It is advantageous to maintain it as small as practicable so that the wide air jet is closely concentrated without substantial turbulence. The arrangement of the extruder nozzle 1 with reference to the roller can vary as necessary. It can be such that the film 2 is extruded vertically downwards to meet the roller at a tangent. It is, however, also possible to select another arrangement so that the film in its passage to the roller takes up a suitable angle to the vertical. The vertical-tangential arrangement, however, appears to be most suitable.

In order to prevent premature cooling of the hot film by air deflected from the jet, it may be of advantage to arrange a baffle plate between extruder and air nozzle, which is met by the air shortly after its direct impingement upon the hot film causing lateral deflection so that streaming of air past the hot film between the roller and nozzle is suppressed.

The width of the air jet should be substantially the same as the width of the film. When using wider air brushes, the overhanging portion of the slot should be laterally masked in order to prevent passage of air into the space between the hot film and the roller. Such passage of air produces fluttering of the film and causes undesirable variations in thickness. A further great advantage of the process of the invention consists in that by means of the air jet the film edges are clearly defined and do not, as hitherto, especially in high speed processes, undergo lateral deviation.

By the admixture of aerosol with the gas (air) for the air brushes, a considerable and surprising improvement in the slip properties of the film is obtained.

Referring to FIG. 2, the admixture of the aerosol takes place through atomizing nozzles inserted into the supply line for the compressed air of the air jet. In FIG. 2 a blower 8 supplies the air nozzle by a pipe line 9, 10 is an atomizing nozzle mounted in a branch 9*a* of the air supply line. A supply vessel 11 contains a solution or dispersion of a slip agent. A compressed air lead 12 supplies the atomizer nozzle 10. The air admixed with aerosol passes to the nozzle 3. The extruder nozzle 1 is also shown in FIG. 2 but the remainder of the extruder is not illustrated. Molten film 2 meets the roller 7, and 5 and 6 are respectively the impingement line and frost line as referred to above.

As stated, FIG. 3 shows the atomizer nozzle of FIG. 2 on a larger scale.

The apparatus of FIGS. 2 and 3 is given by way of example only. The aerosol might also be supplied in some other way. For example compressed air atomizer nozzles may be used such as are described in the report on the "Schwebstofftechnische Arbeitstagung 1954" of 1. Physikinstitut of the Johann Gutenberg University of Mainz, dated December 1954, pages 2 and 12. By means of these nozzles dispersions of the slip agent may be introduced, whereas the nozzles illustrated in FIGS. 2 and 3 are only suitable for solutions for the production of the aerosol.

In the manner described above, the air jet containing the slip agent aerosol meets the film at a similar point to that described above. By the admixture of aerosol with the air for the air brushes there is produced upon the film 2 a drying operation by evaporation of the solvent or dispersing agent used for the aerosol production.

Drying takes place immediately, since the film at this point still retains a considerable heat content.

This process is not detrimental to the appearance of the film. With proper dosage, the slip agent is invisible on the film. The treatment, which takes place on one side of the film only, after rolling up of the film also leads to a slip improvement of the other side of the film, probably for the reason that a proportion of the slip agent is transferred to the other side of the adjacent coil of film on the roll.

The films to which the process of the present invention is applicable are polymers or copolymers of olefins. As examples may be mentioned polyethylene, polypropylene, polybutene-(1), polymethyl-pentene, copolymers of ethylene and propylene, of ethylene and butene-(1), of propylene and butene-(1), and so on.

In the process of the invention the air must be in such excess that no collection of moisture takes place in the air nozzle 3. It may happen, however, that after a long run the slot 4 of the air nozzle 3 may become locally blocked. For this reason it is advisable to clean the air nozzle slot 4 periodically. This may be carried out in such a manner that there is introduced into the slot a narrow plate of a thickness somewhat less than the width of the slot from a lateral direction and it is moved through the slot by means of a wire or metal rod. This operation is advantageously carried out at the time when there is a replacement of the roller upon which the film produced is wound up.

The following example is inserted for the purpose of illustrating the present invention, without any intention of limiting the scope thereof.

*Example*

Polypropylene granulate having a value for the reduced specific viscosity of 2.6 (0.1% in decahydroxynaphthalene at 135° C.) is melted in a screw press of 90 mm. diameter and fed to a slot nozzle of 1000 mm. in width. The temperature within the melt in the nozzle amounts to 270° C. The film nozzle is so arranged that the melted film passes vertically downwards to meet tangentially a chromium plated and highly polished roller with a diameter of 515 mm., cooled with water to 20° C. An air jet nozzle 0.4 mm. wide is so arranged that the air jet meets the film 2 mm. above the impingement line of the film, as defined above. Into the pipe line supplying air to the air nozzle, by means of known atomizing nozzles, 10% aqueous common salt solution is sprayed. The atomizing nozzles are so adjusted that per nozzle 0.3 litre of 10% common salt solution per hour is supplied. The atomizing nozzles are fed with compressed air. The supply to the air jet nozzles takes place by means of a blower with a delivery rate of 10 m.³ per hour. The angle of the jet leaving the nozzle to the normal to the film amounts to 10°, the separating distance of the air nozzle from the film to 5 mm. and the pressure in this nozzle to 250 mm. of water. The number of revolutions of the screw extruder is so adjusted that with a production speed of 50 metres per minute a film of 30µ in thickness is produced. The resulting film is of excellent brilliance and clarity. It has very good slip properties, giving friction figures, determined by the method described below, as follows:

|  | Friction number |
|---|---|
| Treated side to treated side | 4 |
| Untreated side to untreated side | 6 |
| Treated side to untreated side | 5 |

The favorable friction number 6 indicated above with one untreated side on top of another untreated side results from the effect of sprayed salt which is transmitted from the treated side onto the untreated side when the film is wound into a roll.

The use of an air jet without aerosol addition leads to the production of a film having in all three cases friction figures above 25. Subsequent aerosol spraying of a film made without aerosol in the air jet gives the following values:

|  | Friction number |
|---|---|
| Treated side to treated side | 7 |
| Untreated side to untreated side | 10 |
| Treated side to untreated side | 8 |

The friction number is determined as follows:

A piece of film is fixed to a small carriage. Another piece of film is laid on top of it and attached to a dynamometer. A metal plate of a surface area of 10 cm.² with soft rubber adhesively attached thereto and having a compression pressure of 20 p./cm.² is laid on top and the carriage is moved away at a speed of 1 cm./sec. The friction co-efficient, i.e. the measured frictional force divided by the pressure, when multiplied by ten gives the friction number.

It will be obvious to those skilled in the art that many modifications may be made within the scope of the present invention without departing from the spirit thereof, and the invention includes all such modifications.

What we claim is:

1. A process which comprises extruding molten, thermoplastic, film-forming, synthetic polymeric material in the form of a thin film onto a moving quenching surface, and directing a gas jet having a slip-improving agent disposed therein over the entire width of the film before the latter is quenched, whereby the film is pressed against the quenching surface.

2. A process according to claim 1 in which the film contacts the quenching surface earlier than it would in the absence of the gas pressure.

3. A process according to claim 1 in which the angle of incidence of the gas jet is in the range of about 95 to 110°.

4. A process according to claim 1 in which the material is a polyolefin.

5. A process according to claim 1 in which the material is polypropylene.

6. A process according to claim 1 in which the material is extruded vertically downwardly onto the quenching surface.

7. A smooth, uniformly clear film prepared by the process of claim 1.

8. A process according to claim 1 in which the gas jet is air.

9. A process according to claim 1 in which the gas jet is an inert gas.

10. A process according to claim 1 in which the slip-improving agent is in the form of an aerosol.

11. A process according to claim 1 in which the slip-improving agent is an inorganic salt.

12. A process according to claim 1 in which the slip-improving agent is a metal oxide.

References Cited by the Examiner

UNITED STATES PATENTS

| 1,956,330 | 4/1934 | Mullin. | |
|---|---|---|---|
| 2,212,770 | 8/1940 | Foster. | |
| 2,231,057 | 2/1941 | Dieterich | 264—130 |
| 2,289,774 | 7/1942 | Graves | 264—176 |
| 2,364,435 | 12/1944 | Foster et al. | |
| 2,583,330 | 1/1952 | Eckert. | |
| 2,634,459 | 4/1953 | Irons | 264—130 |
| 2,690,592 | 10/1954 | Schanz. | |
| 2,718,666 | 9/1955 | Knox. | |
| 2,736,066 | 2/1956 | Chren et al. | |
| 2,876,497 | 3/1959 | Alexander. | |
| 3,121,915 | 2/1964 | Heller. | |

FOREIGN PATENTS

| 238,733 | 5/1962 | Australia. |
|---|---|---|
| 556,252 | 9/1957 | Belgium. |

OTHER REFERENCES

High Density Polyethylene: Modern Packaging, April 1957, pp. 137–141.

ALEXANDER H. BRODMERKEL, *Primary Examiner.*

MICHAEL V. BRINDISI, *Examiner.*

R. J. DOHERTY, J. R. DUNCAN, A. L. LEAVITT, B. SNYDER, *Assistant Examiners.*